Aug. 3, 1965  W. R. EBERLE  3,198,580
MINING MACHINE AND CONTROL MEANS THEREFOR
Filed July 19, 1960  10 Sheets-Sheet 1

Fig. 1A

INVENTOR;
WILLIAM R. EBERLE,
BY
David Young
ATTY.

Aug. 3, 1965 W. R. EBERLE 3,198,580
MINING MACHINE AND CONTROL MEANS THEREFOR
Filed July 19, 1960 10 Sheets-Sheet 2

Fig.1B

INVENTOR;
WILLIAM R. EBERLE,
BY David Young
ATT'Y.

Aug. 3, 1965   W. R. EBERLE   3,198,580
MINING MACHINE AND CONTROL MEANS THEREFOR
Filed July 19, 1960   10 Sheets-Sheet 4

INVENTOR;
WILLIAM R. EBERLE,
BY David Young
ATT'Y.

Aug. 3, 1965 W. R. EBERLE 3,198,580
MINING MACHINE AND CONTROL MEANS THEREFOR
Filed July 19, 1960 10 Sheets-Sheet 10

*Fig. 8*

INVENTOR;
WILLIAM R. EBERLE,
BY
David Young
ATTY.

United States Patent Office 3,198,580
Patented Aug. 3, 1965

3,198,580
MINING MACHINE AND CONTROL
MEANS THEREFOR
William R. Eberle, Columbus, Ohio, assignor, by mesne assignments, to Jeffrey Galion Manufacturing Company, a corporation of Ohio
Filed July 19, 1960, Ser. No. 43,831
5 Claims. (Cl. 299—1)

The instant invention relates to mining machines and more particularly to a control means therefor for automatically controlling certain operations of the mining machine.

It is an object of the instant invention to provide an automatic control means for operation of a mining machine.

It is another object of the instant invention to provide a control means for automatic control of a mining machine, in which the mining machine includes sensing means for sensing materials of the mine face with the control means being responsive to the operation of the sensing means.

It is a further object of the instant invention to provide a control means for automatically controlling the operation of a mining machine to maintain the operation of the latter in selected material of a mine face.

It is also an object of the instant invention to provide a mining machine having a mining head including a cutting and breaking element having sensing means for sensing the material of the mine face, and a control means for adjusting the mining head to maintain the operation of the mining head and the cutting and breaking element in selected material of the mine face, with the control means being responsive to the operation of the sensing means.

Still a further object of the instant invention is to provide a mining machine having a mining head which is adjustable upwardly and downwardly to maintain the operaiton thereof in selected material of the mine face and a control means for automatically adjusting the mining head.

A still further object of the instant invention is to provide a mining machine having an adjustable mining head and sensing means for sensing the material of the mine face at the bottom thereof, and a control means for automatically adjusting the mining head in response to the operation of the sensing means to maintain the operation of the mining head in selected material of the mine face at the bottom thereof.

Another object of the instant invention is to provide a mining machine having an adjustable mining head and sensing means for sensing the material of the mine face at the top thereof, and a control means for automatically adjusting the mining head to maintain the operation thereof in selected material of the mine face at the top thereof, with the control means being responsive to the operation of the sensing means.

Another object of the instant invention is to provide a mining machine having a lower mining head mounted on an adjustable support for adjusting the lower mining head relatively to the bottom of the mine face, and an upper mining head adjustably supported on the lower mining head for adjusting the upper mining head relatively to the top of the mine face, each of said mining heads including sensing means for sensing the material of the mine face at the bottom and top thereof, respectively, and a control means for automatically adjusting the lower and upper mining heads respectively, to maintain the operation thereof in selected material of the mine face, said control means being responsive to operation of the sensing means of the respective mining heads.

Other objects of the invention will appear hereinafter, the novel features and combinations being set forth in the appended claims.

In the accompanying drawings.

Referring to the drawings, particularly FIGS. 1 to 5, there is illustrated therein a continuous mining machine 10 having a main frame 11. At the opposite sides of the main frame there are provided a left crawler traction means 12 and a right crawler traction means 13 by which the mining machine 10 is propelled. The left and right traction means 12, 13 are individually driven by left and right hydraulic traction motors 14, 15, respectively, each supported on the main frame 11. The left hydraulic traction motor 14 drives the left traction means 12 through a suitable gear system 16, and the right hydraulic traction motor 15 drives the right traction means 13 through a similar gear system 17. The hydraulic traction motors 14, 15 may be operated together at the same speed for propelling the mining machine 10 forward or rearward in a straight line, and the hydraulic traction motors 14, 15 may also be individually operated at different speeds for driving the traction means 12, 13 at different speeds to steer the mining machine 10.

At the forward end of the main frame 11 there is provided a mining head support 18 which is secured to the main frame 11 on a pivot pin 19 for adjustment of the mining head support 18 upwardly and downwardly relatively to the main frame 11. A lower mining head 20 is secured to the top of the mining head support 18 by a pivot pin 21 to permit the lower mining head 20 to be tilted forwardly and rearwardly on the support 18. An upper mining head 22 is supported on the lower mining head 20, above the latter. The lower mining head 20 includes an upright track 23 at each side thereof, and the upper mining head 22 includes a track follower 24 at each side thereof mated with the upright tracks 23, and guiding movement of the upper mining head 22 upwardly and downwardly relatively to the lower mining head 20, and thereby permitting adjustment of the vertical position of the upper mining head 22 relatively to the lower mining head 20.

Figure 1A:
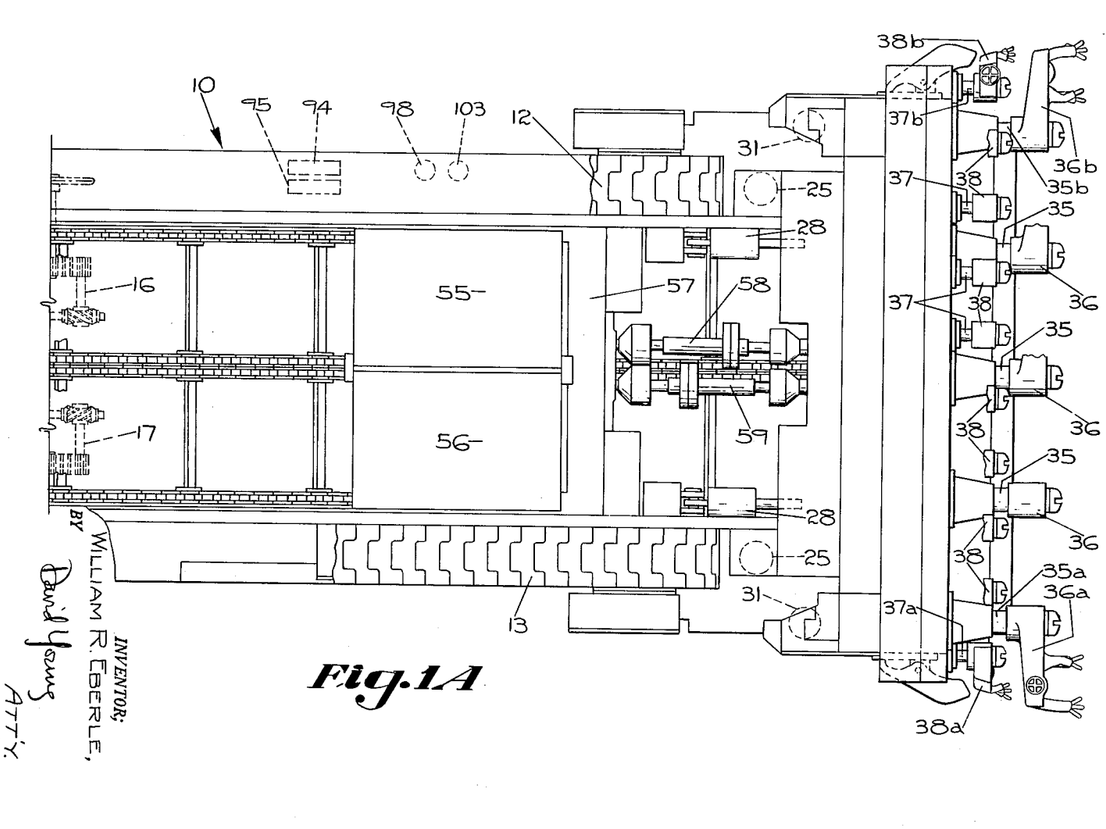
FIGS. 1A and 1B, taken together, are a top plan view of a mining machine embodying the instant invention.
Figure 1B:
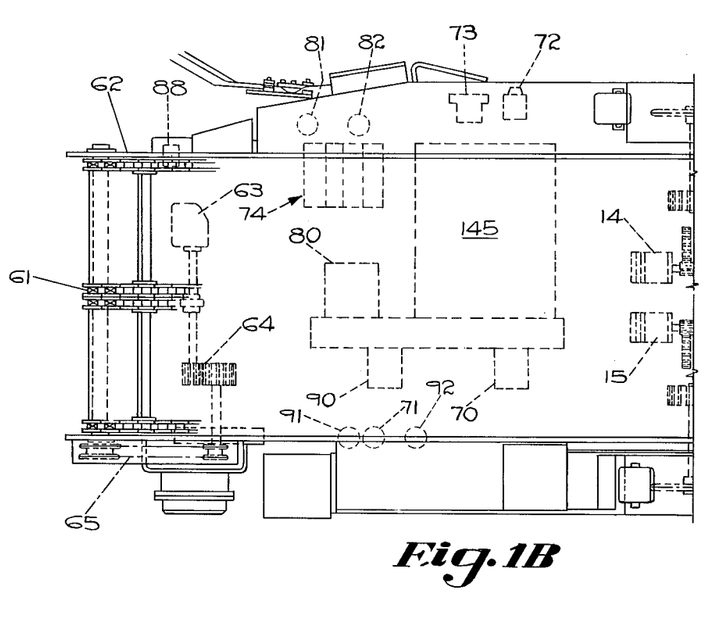
Figure 2A:
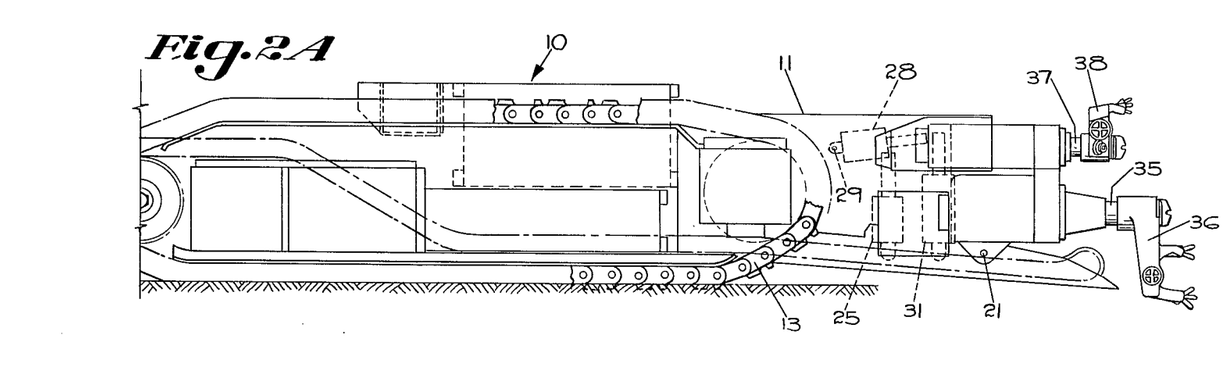
FIGS. 2A and 2B, taken together, are a side elevational view of the mining machine.
Figure 2B:
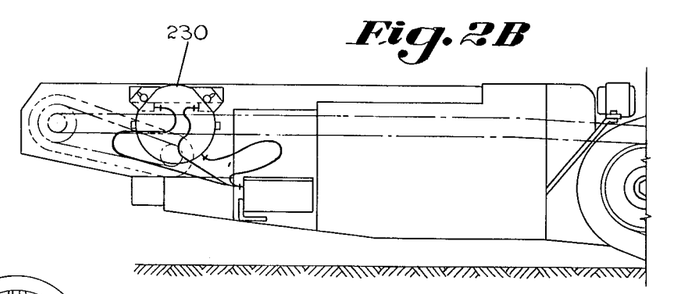
Figure 3:
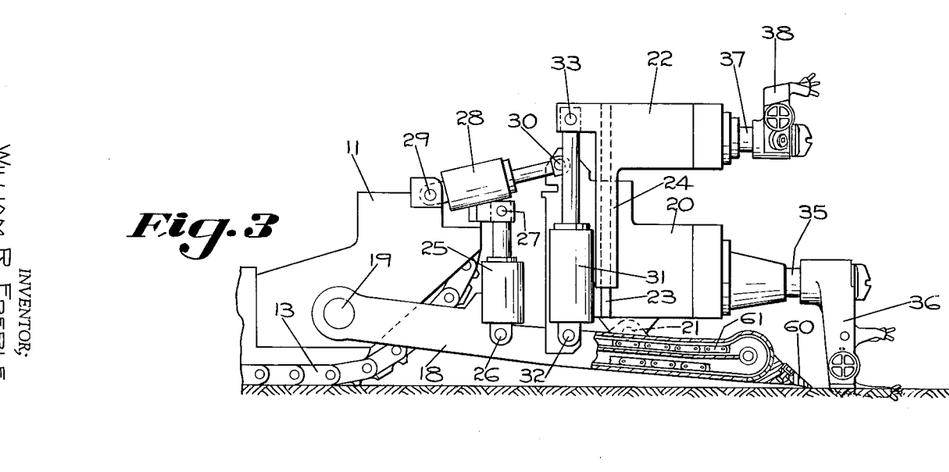
FIG. 3 is an enlarged side elevational view of the mining heads of the mining machine and showing certain elements thereof in detail.

A hydraulic cylinder and piston mechanism 25 has its cylinder end pivotally connected to the mining head support 18 by a pivot pin 26 and piston end thereof is connected to the main frame 11 by a pivot pin 27. The hydraulic cylinder and piston mechanism 25 may be expanded and contracted in the usual manner to lower and raise the support 18 relatively to the main frame 11 by pivoting the support 18 on the axis of the pivot pin 19, thereby also lowering and raising the lower mining head 20, as well as the upper mining head 22 which is supported on the lower mining head 20.

A hydraulic cylinder and piston mechanism 28 has its cylinder end connected to the main frame 11 by a pivot pin 29, and the piston end thereof is connected to the lower mining head 20 by a pivot pin 30. The hydraulic cylinder and piston mechanism 28 may be expanded and contracted in the usual manner and serves to tilt the lower mining head 20, as well as the upper mining head 22 supported thereon, forwardly and rearwardly on the axis of the pivot pin 21, by which the lower mining head 20 is secured to the support 18. In the mining machine 10 the hydraulic cylinder and piston mechanism 28 for tilting the mining head 20, 22 may be manually controlled in the usual manner for such devices.

A hydraulic cylinder and piston mechanism 31 has its cylinder end connected to the lower mining head 20 by a pin 32 and the piston end thereof is connected to the upper mining head 22 by a pin 33. The hydraulic cylinder and piston mechanism 31 may be expanded and contracted in the usual manner to raise and lower the upper mining head 22 relatively to the lower mining head 20, thereby effecting a separating and contracting adjustment of the mining heads 20, 22.

The lower mining head 20 includes a plurality of forwardly extending shafts 35 disposed at equally spaced positions across the front of the lower mining head 20. In the mining machine 10 there are provided five shafts 35. The shafts 35a, 35b at the opposite sides of the lower mining head 20 support cutting and breaking arms 36a, 36b, respectively, each of which extends radially from its shaft 35 and is adapted to be rotated by the latter. The cutting and breaking arms 36a, 36b each includes a sensing device for sensing the material of the mine face, as will be described in greater detail hereinafter. The three intermediate shafts 35 which are disposed between the two outermost shafts 35a, 35b also support radially extending cutting and breaking arms 36 which are similar in construction to the cutting and breaking arms 36a, 36b, with the exception that the cutting and breaking arms 36 do not include sensing devices. The lower mining head 20 encloses a gear system by which the several shafts 35, 35a, 35b are rotated in synchronism, so that while the cutting and breaking arms 36, 36a, 36b have overlapping paths of operation, they do not interfere with each other when they are rotated.

The upper mining head 22 includes a plurality of forwardly extending shafts 37, of which there are ten in the disclosed embodiment of the invention. The two shafts 37a, 37b disposed at the opposite sides of the upper mining head 22 support radially extending cutting and breaking arms 38a, 38b, respectively, each of which includes a sensing device for sensing the material of the mine face, as will be described in greater detail hereinafter. The shafts 37 disposed between the two outermost shafts 37a, 37b support radially extending cutting and breaking arms 38, which are similar in construction to the cutting and breaking arms 38a, 38b, with the exception that they do not include sensing devices. The several cutting and breaking arms 38, 38a, 38b supported by the shafts 37, 37a, 37b have overlapping paths of operation. The upper mining head 22 houses a gear system by which the several shafts 37, 37a, 37b are rotated together, to rotate the cutting and breaking arms 38, 38a, 38b in synchronism to prevent interference of the arms with each other during rotation.

In the operation of the mining machine 10, the latter is propelled forwardly by the traction means 12, 13 to advance the mining heads 20, 22 into the mine face. The cutting and breaking arms of the mining heads 20, 22 are simultaneously rotated, and as they advance into the mine face they operate to remove selected material from the mine face by a cutting and breaking action, the cutting and breaking arms being provided with suitable bits for cutting into the selected material in the mine face and breaking it out of the mine face. The cutting and breaking arms 36, 36a, 36b of the lower mining head 20 have overlapping paths of rotation, and similarly the cutting and breaking arms 38, 38a, 38b of the upper mining head 22 have overlapping paths of rotation, to operate in substantially the whole area of the mine face, as defined by the cumulation of the areas through which the individual cutting and breaking arms rotate.

The mining machine 10 is particularly adapted for operation in coal which is found in underground seams. The seam of coal may vary in height and may also rise and descend. The adjustment of the mining heads 20, 22 upwardly and downwardly, by adjustment of the mining head support 18, accommodates the mining machine 10 to follow the rise and descent of the coal seam. The adjustment of the upper mining head 22 upwardly and downwardly with respect to the lower mining head 20, by which the mining heads 20, 22 are separated or brought together, increases or decreases the height of the mine face area from which material is removed by the cutting and breaking arms, and thereby accommodates the mining machine 10 to the different heights of the coal seam which may be encountered in the mining operation. Above and below the coal there is usually found material, for example, such as rock, which is relatively harder than the coal, the latter being the selected material of the mine face that it is desired to remove therefrom by the operation of the cutting and breaking arms.

The two outermost cutting and breaking arms 36a, 36b of the lower mining head 20, and the two outermost cutting and breaking arms 38a, 38b of the upper mining head 22 each includes a sensing device for sensing the material of the mine face which is different from the selected material thereof. The sensing function is accomplished by devices incorporated within the cutting and breaking arms 36a, 36b, 38a, 38b, as will be described in greater detail hereinafter, that are responsive to the relative hardness of the materials in the mine face. By consideration of the disposition of the several cutting and breaking arms of the mining heads 20, 22, it will be seen that the cutting and breaking arms operate in a substantially rectangular area of the mine face, the corners of which area are rounded. The sensing function of each cutting and breaking arm 36a, 36b, 38a, 38b occurs in a quadrant of operation of the respective cutting and breaking arms, which is disposed in the perimeter of the mine face area from which material is removed by the operation of the cutting and breaking arms, and corresponding to the rounded corners of the substantially rectangular mine face area.

Figure 4:
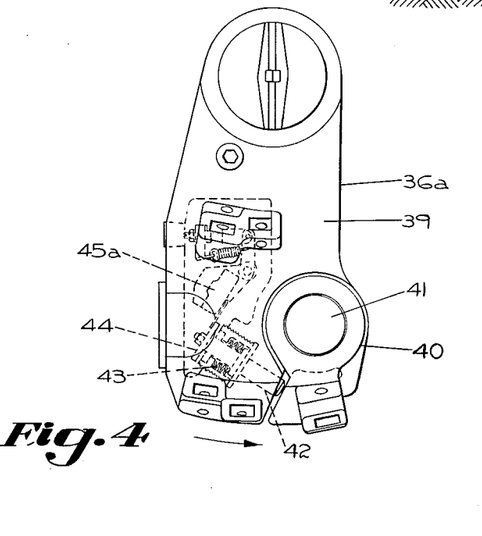
FIG. 4 is a front elevational view of a lower cutting and breaking arm.

Referring to FIG. 4, there is illustrated therein the cutting and breaking arm 36a incorporating a sensing device for sensing the material of the mine face. The cutting and breaking arm 36a may be constructed in accordance with the invention of the applicant herein, as disclosed in his copending patent application, Serial No. 43,871, filed July 19, 1960, for a Mining Machine Cutting and Breaking Arm, now Patent No. 3,102,718. The cutting and breaking arm 36b may be constructed the same as the cutting and breaking arm 36a, except that the former is reversely constructed relatively to the latter, since the respective cutting and breaking arms 36a, 36b are rotated in opposite directions. Therefore, the description may proceed with respect to the cutting and breaking arm 36a only, it being understood that the description is also applicable to the cutting and breaking arm 36b.

The cutting and breaking arm 36a includes a sensing bit assembly 40 which is secured to the main body 39 of the cutting and breaking arm 36a by a pivot pin 41. The sensing bit assembly 40 may move relatively to the main body 39 of the cutting and breaking arm 36a by rotation thereof on the axis of the pivot pin 41 in a clockwise direction, as viewed in FIG. 4. The movement of the sensing bit assembly 40 is opposed by a thrust pin 42 slidably supported in the main body 39 and abutting the sensing bit assembly 40. The thrust pin is yieldably urged against the sensing bit assembly 40 by a plurality of coned disc springs 43, the force of which must be overcome for rotative movement of the sensing bit assembly 40. The coned disc springs 43 are calibrated so that when the sensing bit assembly 40 is operated in the selected material of the mine face, which is the coal, the force acting on the sensing bit assembly 40 is insufficient to overcome the force of the springs 43, and accordingly, there is no rotative movement of the sensing bit assembly 40. However, when the sensing bit assembly 40 is operated in material different from the selected material, such as rock, which is relatively harder than the selected material, there will be a greater force acting on the sensing bit assembly 40, overcoming the force of the springs 43, and producing rotative movement of the sensing bit assembly 40 and sliding movement of the thrust pin 42 in the cutting and breaking arm main body 39. The outer end of the thrust pin 42 includes a switch plate 44 which is operative to actuate a switch 45a by sliding movement of the thrust pin 42. The switch 45a is included in a circuit, as will be described hereinafter, and operates therein to provide a signal indicating the operation of the sensing bit assembly 40 and the cutting and breaking arm 36a in material different from the selected material of the mine face.

Figure 5:
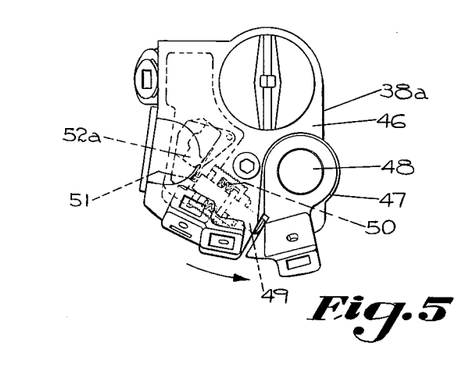
FIG. 5 is a front elevational view of an upper cutting and breaking arm.

The cutting and breaking arm 38a of the upper mining head 22 also includes a sensing device for sensing material of the mine face which is different from the selected material thereof. The cutting and breaking arm 38a may be constructed in accordance with the invention of the applicant herein, as disclosed in his copending patent application, Serial No. 43,871, filed July 19, 1960, for a Mining Machine Cutting and Breaking Arm. The cutting and breaking arm 38b may be constructed the same as the cutting and breaking arm 38a, except that the former is reversely constructed relatively to the latter, since the respective cutting and breaking arms 38a, 38b are rotated in opposite directions. Therefore, the description may proceed with respect to the cutting and breaking arm 38a only, it being understood that the description is also applicable to the cutting and breaking arm 38b.

The cutting and breaking arm 38a has a main body 46 to which a sensing bit assembly 47 is secured by a pivot pin 48. The sensing bit assembly 47 may move relatively to the main body 46 by rotation of the sensing bit assembly 47 in a clockwise direction about the pivot pin 48, as viewed in FIG. 5. A thrust pin 49 is slidably supported in the main body 46 and abuts the sensing bit assembly 47. A plurality of coned disc springs 50 are disposed in engagement with the thrust pin 49 with the force of the springs 50 being applied to the thrust pin 49 to yieldably urge it against the sensing bit assembly 47 to oppose rotative movement of the latter. The coned disc springs 50 are calibrated, so that when the sensing bit assembly 47 is operated in selected material of the mine face, which is the coal, the force acting on the sensing bit assembly 47 will be insufficient to overcome the force of the springs 50, and there will be no rotative movement of the sensing bit assembly 47 relatively to the main body 46. When the sensing bit assembly 47 is operated in material different from the selected material of the mine face, such as rock, which is harder than the selected material, there will be a greater force acting on the sensing bit assembly 47, which will overcome the force of the springs 50 and produce rotative movement of the sensing bit assembly, as well as movement of the thrust pin 49 relatively to the main body 46. The outer end of the thrust pin 49 is formed with a switch actuator 51 which is adapted to operate a switch 52a when the thrust pin 49 moves relatively to the main body 46. The switch 52a is included in a circuit, as will be described hereinafter, and is adapted to provide a signal therein indicating the operation of the sensing bit assembly 47 and the cutting and breaking arm 38a in material different from the selected material of the mine face.

A left head motor 55 and a right head motor 56 are provided on the main frame 11, and the drives thereof are delivered to a gear system enclosed within a gear housing 57 disposed at the front of the motors 55, 56. The gear system within the gear housing 57 combines the power of the motors 55, 56. A drive shaft 58 delivers power from the gear housing 57 to the lower mining head 20, and a similar drive shaft 59 delivers power from the gear housing 57 to the upper mining head 22. Each of the drive shafts 58, 59 includes a telescopic section and is universally jointed at its ends to permit adjustment of the mining heads 20, 22, as above described.

The front of the mining head support 18 includes a dozer blade 60 which is operated along the floor of the mine room to remove the cusps formed on the floor by the operation of the cutting and breaking arms 36 of the lower mining head 20. The mining head support 18 also supports the tail end of a conveyor 61 which extends the length of the mining machine 10, between the front end of the support 18 and the discharge end 62 of the mining machine 10. The material which is removed from the mine face falls on the mine floor, and by the forward advance of the mining machine 10 it is crowded onto the conveyor 61 and carried by the latter to the discharge end 62 of the mining machine 10, whence it is discharged to shuttle cars or to a suitable conveyor system which follows the mining machine 10. The conveyor 61 is driven by a hydraulic motor 63 which delivers its drive to the conveyor 61 through a suitable gear system 64 and a chain and sprocket drive 65.

Figure 6:
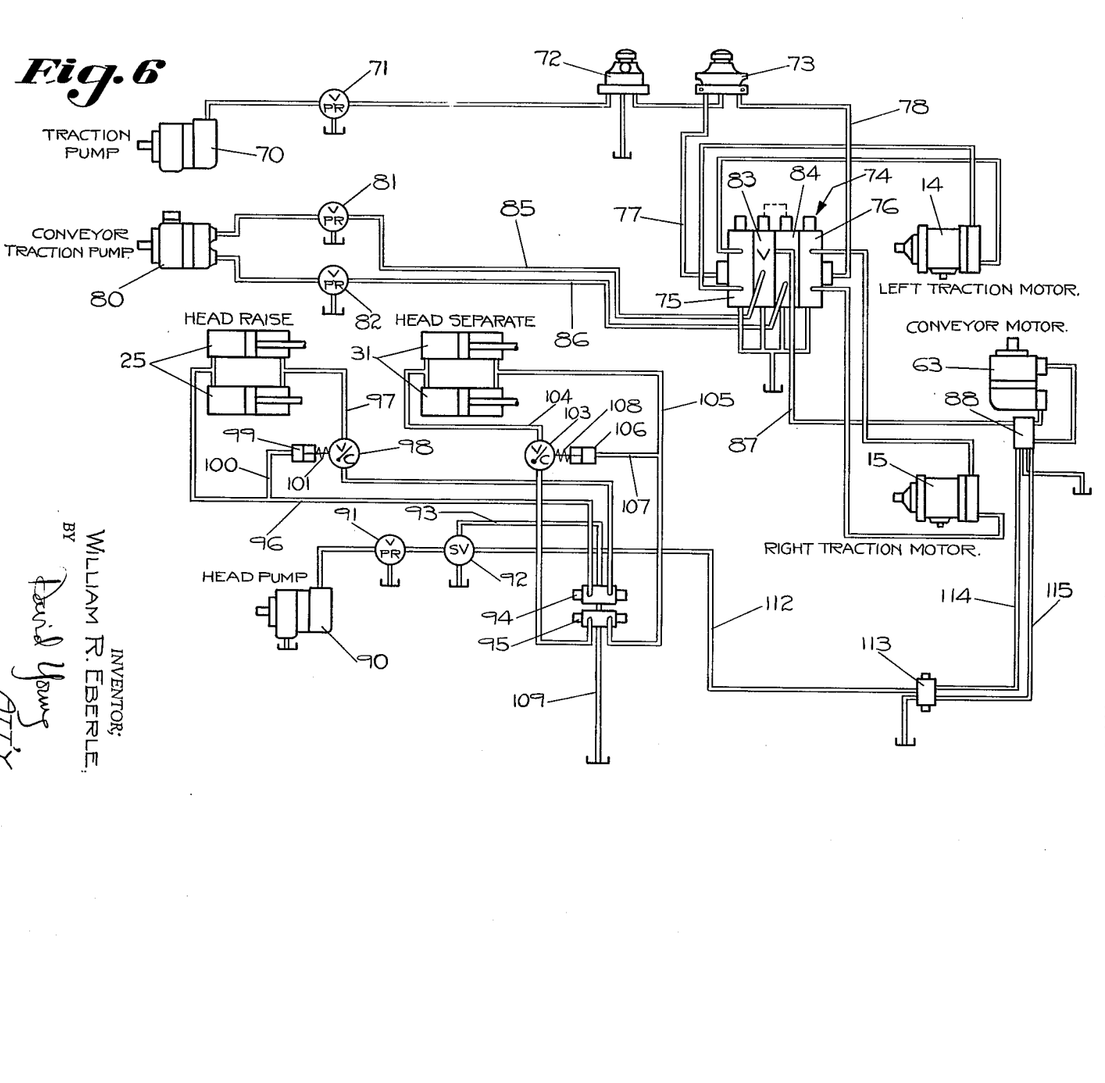
FIG. 6 is a diagrammatical illustration of the hydraulic system for operation of the mining machine.
Figure 7A:
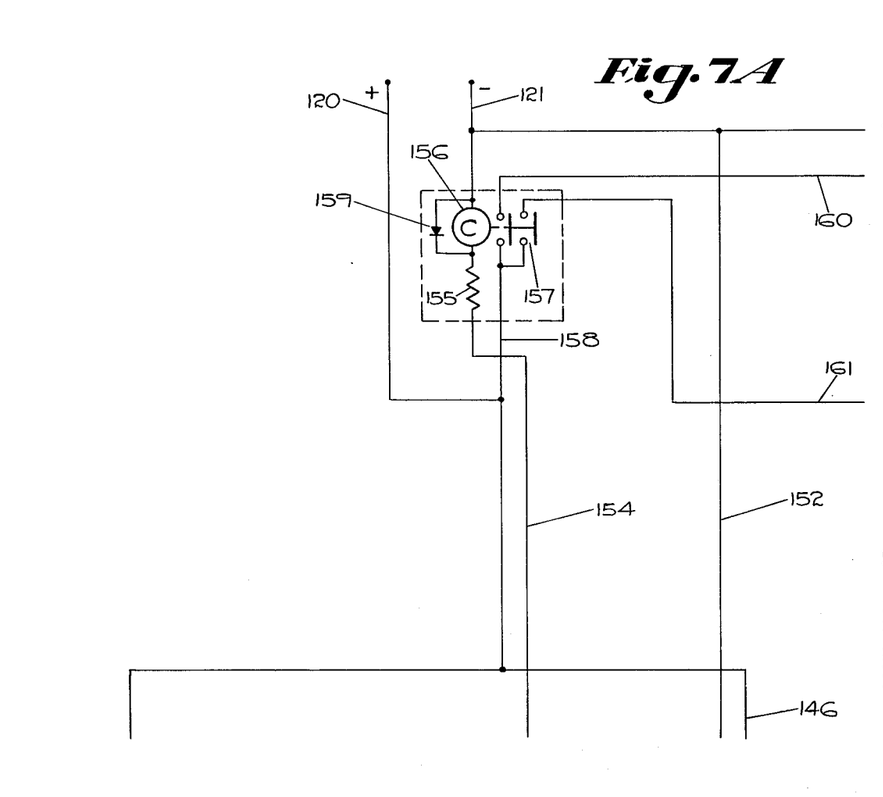
FIGS. 7A, 7B, 7C and 7D, taken together, are a diagrammatical illustration of the electrical control circuit of the mining machine.
Figure 7B:
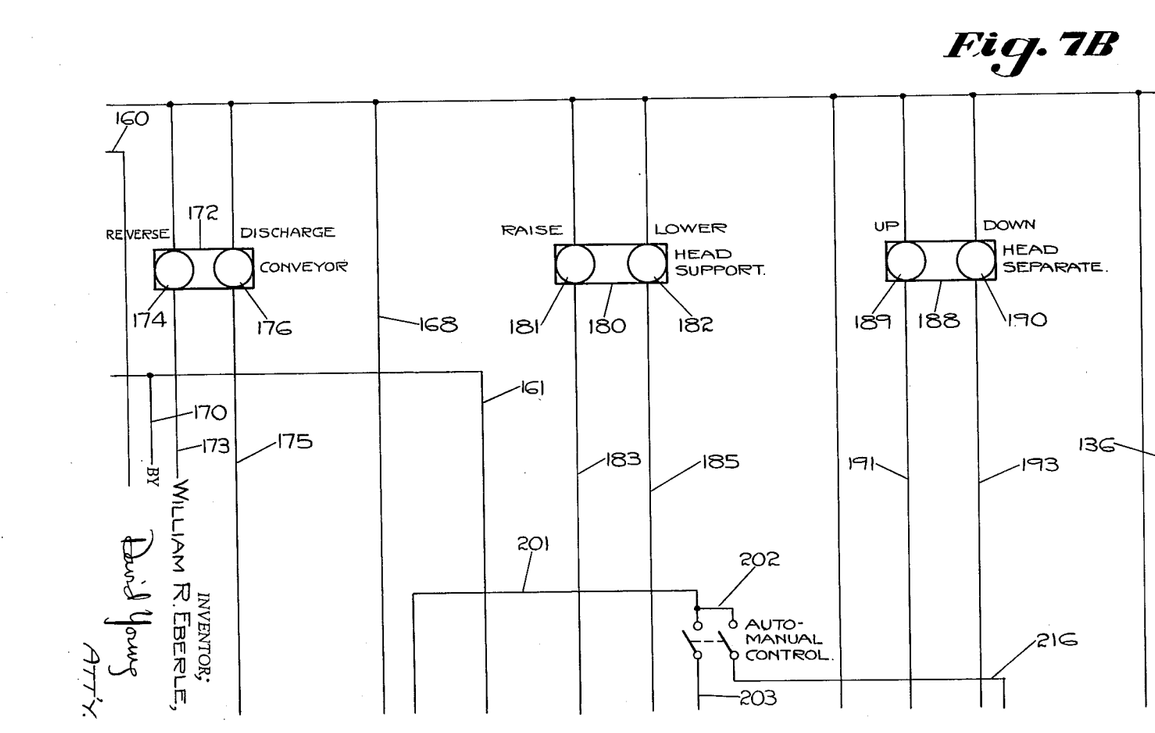
Figure 7C:
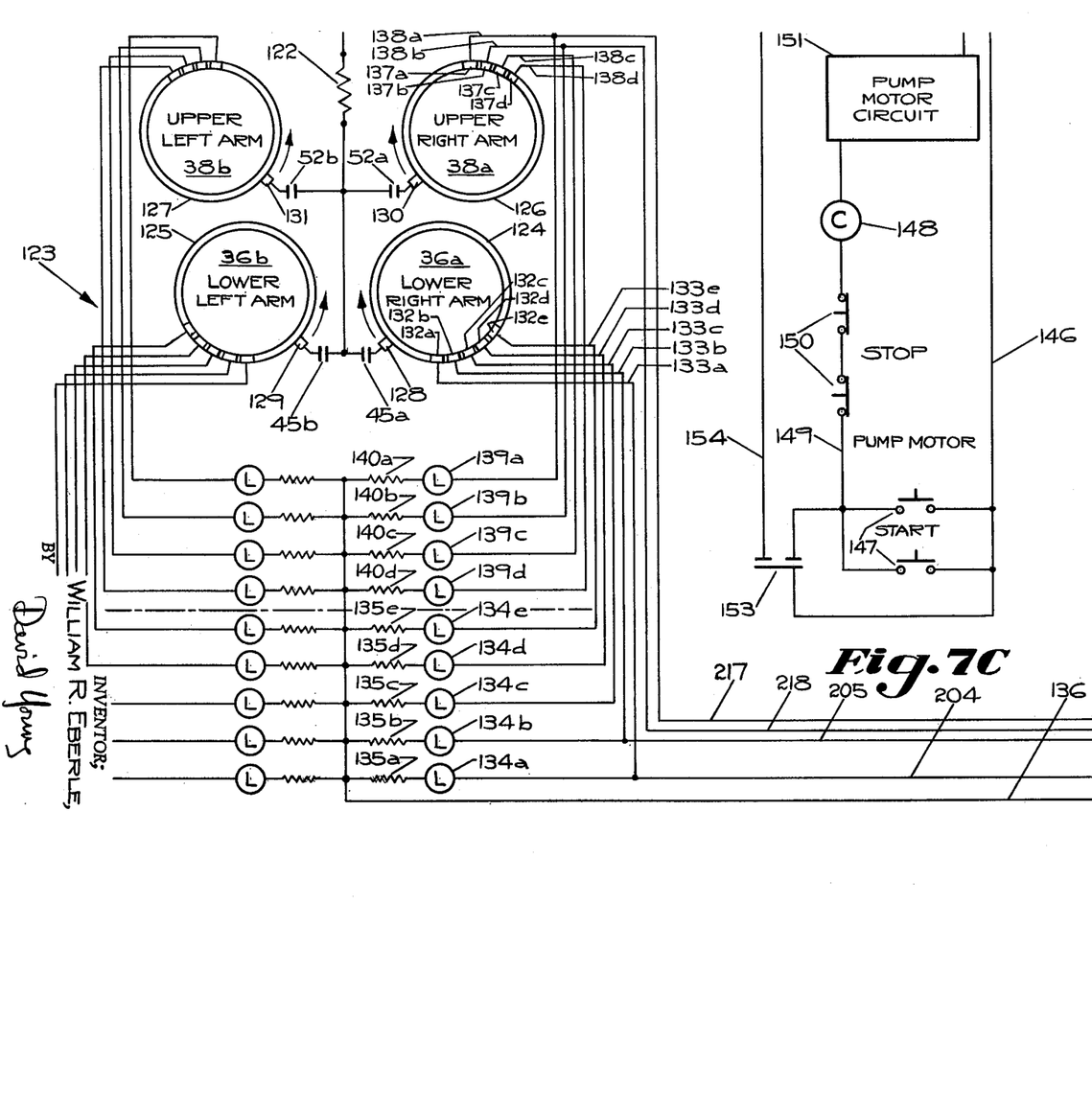
Figure 7D:
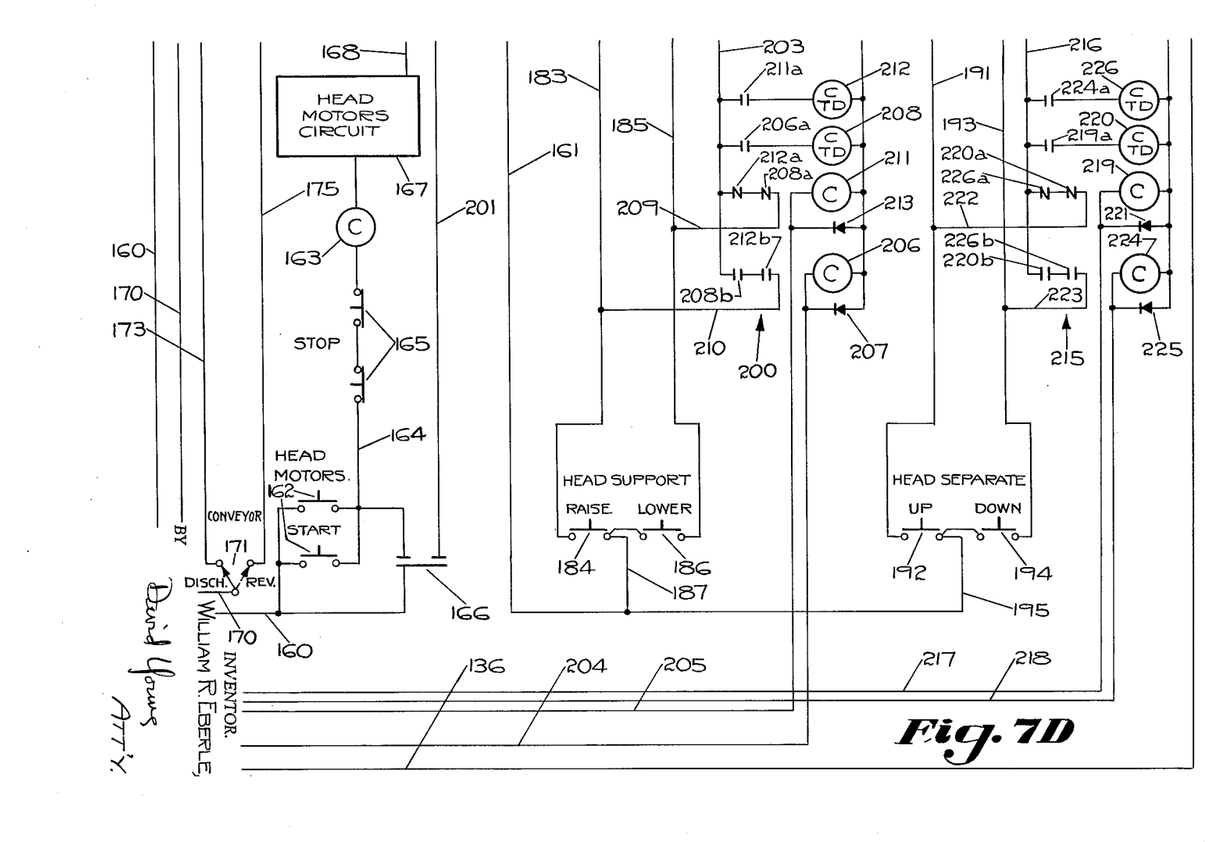

The mining machine 10 includes a hydraulic system for operation of certain elements thereof, which is diagrammatically illustrated in FIG. 6. A traction pump 70 is provided for delivering hydraulic fluid pressure to the left and right hydraulic traction motors 14, 15. Hydraulic fluid under pressure is delivered by the traction pump 70 through pressure relief valve 71 to a volume control valve 72, which may be operated manually to control the volume of hydraulic fluid delivered to the hydraulic traction motors 14, 15, thereby controlling the speed of the latter. The hydraulic fluid flows from the volume control valve 72 through a variable flow proportioner valve 73, which divides the flow of hydraulic fluid to the two traction motors 14, 15. The variable flow proportioner valve 73 may be operated manually, and when it is operated to evenly divide the flow of hydraulic fluid to the two hydraulic traction motors 14, 15, the latter will be operated together at the same speed. The relative volume of hydraulic fluid delivered to the hydraulic motors 14, 15 may be varied by operation of the proportioner valve 73, to drive the traction motors 14, 15 at different speeds, as in steering the mining machine 10.

The hydraulic operating system includes a four unit valve 74 which may be constructed similarly to the valve illustrated in FIGS. 17 to 20 of the copending patent application of Sterling C. Moon, Serial No. 838,110, filed Septemebr 4, 1959, for Continuous Mining Machine and Control System Therefor. The four unit valve 74 comprises reversing valves 75, 76. The hydraulic fluid is delivered from the proportioner valve 73 to the reversing valves 75, 76 through hydraulic lines 77, 78, respectively. The reversing valve 75 controls the delivery of hydraulic fluid to the left traction motor 14, and the reversing valve 76 controls the delivery of hydraulic fluid to the right traction motor 15. By operation of the reversing valves 75, 76 the direction of flow of hydraulic fluid to the traction motors 14, 15 may be reversed for reversing the operation of the hydraulic motors 14, 15, to propel the mining machine 10 either forwardly or rearwardly. The traction pump 70 delivers sufficient hydraulic fluid to the traction motors 14, 15 for driving the latter at low speed, which is used in advancing the mining machine 10 during the mining operation.

A conveyor-traction pump 80 delivers hydraulic fluid under pressure through pressure relief valves 81, 82 to each of two flow control valves 83, 84, which are included in the four unit valve 74. The hydraulic fluid under pressure from the conveyor-traction pump 80 is individually delivered to the flow control valves 83, 84 through hydraulic lines 85, 86, respectively. The flow control valves 83, 84 are formed as separate valves within the four unit valve 74, but are operated together. The flow control valves 83, 84 deliver hydraulic fluid through a single hydraulic line 87 to a reversing valve 88 from which the hydraulic fluid is delivered to the conveyor hydraulic motor 63. The direction of flow of hydraulic fluid to the conveyor motor 63 is controlled by the reversing valve 88, and permits operation of the conveyor 61 in discharging or reverse direction.

When it is desired to propel the mining machine 10 at high speed as in tramming, the hydraulic fluid delivered by the conveyor-traction pump 80 is combined with the hydraulic fluid delivered by the traction pump 70, to augment the volume of hydraulic fluid delivered to the traction motors 14, 15 for operating the traction motors 14, 15 at high speed. This is accomplished by operation of the flow control valves 83, 84 to discharge the hydraulic fluid from the conveyor-traction pump 80 from the flow control valves 83, 84 to the reversing valves 75, 76, respectively, whence the combined volume of hydraulic fluid is delivered to the traction motors 14, 15, respectively. It will be understood that when the traction motors 14, 15 are driven at high speed, the hydraulic fluid normally used to drive the conveyor motor 63 is diverted from the latter, and the conveyor 61 is thereby rendered inoperative. In the mining machine 10 embodying the instant invention the four unit valve 74 may be manually operated in the usual manner.

The head pump 90 delivers hydraulic fluid under pressure to the hydraulic cylinder and piston mechanisms 25, by which the mining head support 18 is adjusted to raise and lower the mining heads 20, 22, and to the hydraulic cylinder and piston mechanisms 31, by which the mining head 22 is raised or lowered relatively to the lower mining head 20. The head pump 90 delivers hydraulic fluid under pressure through a pressure relief valve 91 and through a sequence valve 92, and thence through a hydraulic line 93 to a pair of solenoid controlled, pilot operated, control valves 94, 95. The solenoid controlled, pilot operated, control valves 94, 95 may be constructed similarly to the hydraulic control valve illustrated in FIG. 12 of the copending patent application of Sterling C. Moon, Serial No. 838,110, filed September 4, 1959, for Continuous Mining Machine and Control System Therefor. The control valve 94 controls the operation of the hydraulic cylinder and piston mechanisms 25, and the control valve 95 controls the operation of the hydraulic cylinder and piston mechanisms 31. The operation of the control valves 94, 95 is as described in the copending patent application of Sterling C. Moon, above identified.

Operation of the control valve 94 to deliver hydraulic fluid under pressure through hydraulic line 96 operates the cylinder and piston mechanisms 25 to expand the latter and to lower the mining head support 18 and the mining heads 20, 22. During this operation, hydraulic fluid is discharged from the piston ends of the hydraulic cylinder and piston mechanisms 25 through a hydraulic line 97, which includes a check valve 98 that is normally closed to prevent discharge flow of hydraulic fluid from the cylinder and piston mechanisms 25 through the hydraulic line 97. The check valve 98 includes a hydraulic pilot 99 for opening the check valve 98, to which hydraulic fluid under pressure is supplied through pilot line 100. Thus, the hydraulic fluid under pressure flowing through the hydraulic line 96 is communicated through pilot line 100 to the pilot 99, and operates the check valve 98 to open the latter and to permit discharge flow of hydraulic fluid from the cylinder and piston mechanisms 25 through the hydraulic line 97. There is provided a return spring 101 which restores the pilot 99 upon stoppage of the flow of hydraulic fluid under pressure through hydraulic line 96 and pilot line 100. The hydraulic fluid discharging from the hydraulic cylinder and piston mechanisms 25 during the operation thereof is returned to the control valve 94, and thence to a hydraulic fluid reservoir tank. Opposite adjustment of the hydraulic cylinder and piston mechanisms 25 is accomplished by operation of the control valve 94 to deliver hydraulic fluid under pressure to the piston ends of the hydraulic cylinder and piston mechanisms 25 through the hydraulic line 97. The check valve 98 normally permits flow of hydraulic fluid through the hydraulic line 97 for delivery to the piston ends of the hydraulic cylinder and piston mechanisms 25. Since the hydraulic line 96 is open, hydraulic fluid will freely discharge from the cylinder ends of the hydraulic cylinder and piston mechanisms 25. When the valve 94 is set in neutral position, flow of hydraulic fluid to and from the hydraulic cylinder and piston mechanisms 25 is blocked, and the latter is thereby held in adjusted position.

The solenoid controlled, pilot operated, control valve 95 may be operated for delivery of hydraulic fluid under pressure through hydraulic line 104 and through check valve 103 to the cylinder ends of the cylinder and piston mechanisms 31 for expanding the latter to raise the upper mining head 22 with respect to the lower mining head 20, thereby separating the mining heads 20, 22. Hydraulic fluid discharges from the piston ends of the cylinder and piston mechanisms 31 through a hydraulic line 105 which returns the discharging hydraulic fluid through the control valve 95 to a hydraulic fluid reservoir tank. To lower the upper mining head 22, the control valve 95 is operated to deliver hydraulic fluid under pressure through the hydraulic line 105 to the piston ends of the cylinder and piston mechanisms 31, thereby contracting the hydraulic cylinder and piston mechanisms 31. Hydraulic fluid discharges from the cylinder ends of the hydraulic cylinder and piston mechanisms 31 through the hydraulic line 104. The check valve 103 normally blocks return flow of hydraulic fluid through the hydraulic line 104. To open the check valve 103 for return flow of hydraulic fluid, there is provided a pilot 106 which is operated by hydraulic fluid supplied thereto from the hydraulic line 105 through a pilot line 107. The pilot 106 has a return spring 108 for restoring the pilot 106 when the flow of hydraulic fluid under pressure through hydraulic line 105 has been stopped.

The control valves 94, 95 are connected in series, whereby hydraulic fluid delivered through the hydraulic line 93 will flow through the control valve 94 to the control valve 95. A hydraulic line 109 receives the discharge of hydraulic fluid from the control valve 95 for delivering the same to a hydraulic fluid reservoir tank.

Hydraulic fluid at a predetermined pressure is delivered from the sequence valve 92 through a hydraulic line 112 to a solenoid controlled pilot valve 113, which is connected by hydraulic lines 114, 115 to the reversing valve 88, for operation of the latter by the solenoid controlled pilot valve 113. The solenoid controlled pilot valve 113 may be constructed similarly to the solenoid controlled pilot valve illustrated in FIG. 13 of the copending patent application of Sterling C. Moon, Serial No. 838,110, filed September 4, 1959, for Continuous Mining Machine and Control System Therefor. The solenoids of the pilot valve 113, as well as the solenoids of the control valves 94, 95 are included in an electrical circuit as will be described hereinafter.

The electrical circuit for control of the mining machine 10 is diagrammatically illustrated in FIGS. 7A, 7B, 7C and 7D. Electrical power is delivered to the circuit through a positive line 120 and a negative line 121. The positive line 120 is connected to a resistor 122 which reduces the current delivered to the sensing circuit 123 to such a level that there will not be sufficient current in the sensing circuit 123 to produce an incendiary spark in the sensing circuit 123, thereby rendering the latter safe.

The sensing circuit 123 includes a commutator 124 for the lower cutting and breaking arm 36a at the right side of the mining machine 10, and a similar commutator 125 for the lower cutting and breaking arm 36b at the left side of the mining machine 10. There is also included a commutator 126 for the upper cutting and breaking arm 38a at the right side of the mining machine 10, and commutator 127 for the upper cutting and breaking arm 38b at the left side of the mining machine 10. The several commutators 124, 125, 126 and 127 are each concentrically disposed with the paths of rotation of the several cutting and breaking arms 36a, 36b, 38a, 38b, respectively. The construction of the commutators and the associated electrical elements in the lower and upper mining heads 20, 22, may be as described in the copending patent application of the applicant herein, Serial No. 43,871, filed July 19, 1960, for Mining Machine Cutting and Breaking Arm. Brushes 128, 129, 130, 131 revolve around the commutators 124, 125, 126, 127, respectively, and make electrical contact with the segments of the respective commutators. The switch 45a, which is included in the lower cutting and breaking arm 36a, is connected to the brush 128. Similarly, the brush 129 has a switch 45b connected thereto, which is included in the sensing means of the lower cutting and breaking arm 36b at the left side of the mining machine 10. The switch 52a which is included in the sensing means of the upper cutting and breaking arm 38b is connected to the brush 130, and a similar switch 52b included in the sensing means of the upper cutting and breaking arm 38b at the left side of the mining machine 10 and is connected to the brush 131. By closing of any of the switches 45a, 45b, 52a, 52b, there is provided a circuit through the respective brushes 128, 129, 130, 131.

The portions of the sensing circuit 123 at the right and left sides of the mining machine 10 are similar in construction and operation, and accordingly, the description will proceed with respect to the right side of the sensing circuit 123 and the mining machine 10, except as may be otherwise noted. The sensing means of the lower cutting and breaking arm 36a is adapted to sense the material of the mine face at the lower right corner of the mine face area from which material is removed by the mining machine 10. Accordingly, five segments 132a, b, c, d, e of the commutator 124 lying in a quadrant corresponding to the lower right corner of the mine face area are utilized for the sensing operation. Lines 133a, b, c, d, e are individually connected to commutator segments 132a, b, c, d, e, respectively, and to signal lights 134a, b, c, d, e, respectively, which are arranged in a vertical line. Resistors 135a, b, c, d, e are connected in series with the lights 134a, b, c, d, e, respectively, to limit the current through the lights in accordance with the size thereof. The several resistors 135a, b, c, d, e are connected to a negative line 136. The lights 134a, b, c, d, e are vertically arranged to correspond to the vertical positions of the corresponding commutator segments 132a, b, c, d, e, respectively.

Segments 137a, b, c, d of the commutator 126, which lie in a quadrant corresponding to the upper right corner of the mine face area from which material is removed during the mining operation, are connected by lines 138a, b, c, d, respectively, to individual lights 139a, b, c, d, respectively, which are arranged in a vertical line above the lights 134a, b, c, d, e, and correspond in vertical position to the vertical positions of the commutator segments 137a, b, c, d. Resistors 140a, b, c, d are connected in series with the respective lights 139a, b, c, d to limit the current to the lights in accordance with the size thereof. The resistors 140a, b, c, d are connected to the negative line 136.

Considering the cutting and breaking arm 136a at the lower right side of the mining machine 10, upon operation of the arm 36a in material of the mine face different from the selected material thereof, the switch 45a will be closed thereby closing the circuit to the brush 128. As the brush 128 revolves around the commutator 124, it will successively contact the commutator segments 132a, b, c, d, e and will set up a circuit through one or more of the segments 132a, b, c, d, e depending upon the depth to which the sensing bit assembly 40 is worked into the material of the mine face which is different from the selected material thereof. Thus, if the sensing bit assembly 40 merely skims the different material of the mine face, the switch 45a will be closed when the brush 128 is in contact with the commutator segment 132a, and there will be a circuit through line 133a to illuminate the light 134a at the bottom of the vertical row of lights. If the sensing bit assembly 40 penetrates the different material of the mine face to a sufficient depth that the switch 45a is closed when the brush 128 contacts each of the commutator segments 132a, b, c, d, e each of the lights 134a, b, c, d, e will be successively illuminated as the brush 128 contacts the successive commutator segments 132a, b, c, d, e. Thus, by observation of the lights 134a, b, c, d, e, the operator of the mining machine 10 can determine the depth of penetration of the sensing bit assembly 40 and the cutting and breaking arm 36a into the different material of the mine face, and of course, adjustment of the mining heads 20, 22 can be made in accordance with the signals to withdraw the cutting and breaking arms from the different material of the mine face to maintain the operation thereof in the selected material of the mine face.

The sensing means of the upper cutting and breaking arm 38a operates similarly to the sensing means for the lower cutting and breaking arm 36a, and operates with respect to a corner of the mine face area which is at the top of the latter, and accordingly, the sensing is with respect to the top of the mine face area. Five signal lights 134a, b, c, d, e are provided for sensing of the bottom of the mine face area, and four signal lights 139a, b, c, d are provided for sensing the top of the mine face area. The number of signal lights provided for sensing the bottom and the top of the mine face may be varied from that described herein, the disclosed arrangement being a preferred embodiment found to be satisfactory for operation as described herein. The ideal operation of the mining machine 10 is to operate the cutting and breaking arms 36a, 38a in such manner that the respective sensing bit assemblies 40, 47 will only skim the different material of the mine face below and above the selected material thereof. Such operation will illuminate the lowermost light 134a, and the upper-most light 139a, and provides signals to the machine operator that the cutting and breaking arms 36a, 38a are being operated at the lower and upper limits of the selected material in the mine face. The signal lights 134, 139 are duplicated for the cutting and breaking arms 36b, 38b at the left side of the mining machine 10, with the lights for the two sides of the mining machine 10 being arranged in two vertical lines to correspond to the vertical limits of the selected material in the mine face at the two sides thereof.

To start operation of the mining machine 10 the pump motor 145, which drives the several hydraulic pumps, is first started. A positive line 146 is connected to a normally open dual starting switch 147 for the pump motor 145. The dual starting switch 147 includes a starting switch on each side of the mining machine 10, so that the pump motor 145 may be started from either side thereof. Upon closing of the starting switch 147, the relay coil 148 is energized through the line 149, which includes a normally closed dual stop switch 150, by which the pump motor 145 may be stopped. The stop switch 150 includes a switch at each side of the mining machine 10, so that the pump motor may be stopped from either side of the mining machine 10. The line 149 also connects to the pump motor circuit 151 for energizing the latter. The pump motor circuit 151 is connected by a line 152 to the negative line 121. Energization of the relay coil 148 closes a normally open dual relay contactor 153, which connects the line 149 to the positive line 146, to maintain the circuit after the starting switch 147 is released and restores itself to open position.

A line 154 connects from one side of the dual contactor 153 to a resistor 155, which is connected in series with a coil 156 and thence to the negative line 121. Thus, upon closing of the contactor 153, the coil 156 is energized. The resistor 155 limits the current through the coil 156. The coil 156 operates a normally open dual contactor 157, which is closed by energization of the coil 156. A rectifier 159 is connected across the coil 156 for the purpose of rendering the circuit safe by preventing the production of an incendiary spark, as may result from the reverse voltage induced in the coil 156 when the latter is deenergized. One side of the dual contactor 157 is connected to a positive line 158.

Upon closing of the dual contactor 157, current is supplied to the positive lines 160, 161. The positive line 160 connects to the head motors starting switch 162, the latter being a normally open dual switch, including a switch at each side of the mining machine 10. Upon closing of the starting switch 162, the relay coil 163 is energized through line 164, which includes a normally closed dual stop switch 165 for stopping operation of the head motors 55, 56. The stop switch 165 includes a switch at each side of the mining machine 10, so that the head motors 55, 56 can be stopped from either side of the mining machine 10. Energization of the relay coil 163 closes a normally open dual relay contactor 166, and provides a connection from the positive line 160 to the line 164 after the starting switch 162 is released and restores itself to its open position. The line 164 connects to the head motors circuit 167 to provide current thereto, and a line 168 connects the head motors circuit 167 to the negative line 121.

A positive line 170 connects from the positive line 161 to a two position conveyor switch 171, by which the direction of operation of the conveyor 61 is controlled. The solenoid controlled pilot valve 113 includes a solenoid 172, which is energized by the operation of the conveyor switch 171. A line 173 connects one side of the conveyor switch 171 to a coil 174 of the solenoid 172. A second line 175 connects the other side of the conveyor switch 171 to a coil 176 of the solenoid 172. Operation of the conveyor switch 171 to energize the coil 174 will operate the pilot valve 113 for setting the reversing valve 88 to operate the conveyor 61 in a direction to discharge material from the mining machine 10. Operation of the conveyor switch 171 to energize the solenoid coil 176 will produce reverse operation of the conveyor 61, and is utilized to loosen material on the conveyor 61 that may become jammed during the operation of the latter.

The solenoid controlled pilot operated, control valve 94 includes a solenoid 180 having solenoid coils 181, 182. The solenoid coil 181 is connected by a line 183 to a switch 184, and the solenoid coil 182 is connected by a line 185 to a switch 186. The switches 184, 186 have a common connection through line 187 to the positive line 161. Operation of the switch 184 energizes the solenoid coil 181 for operation of the control valve 94 to raise the head support 18 and the mining heads 20, 22. Operation of the switch 186 similarly energizes the solenoid coil 182 for operation of the control valve 94 to lower the head support 18 and the mining heads 20, 22. The switches 184, 186 constitute a manual means for raising and lowering the head support 18 and the mining heads 20, 22.

The solenoid controlled, pilot operated, control valve 95 includes a solenoid 188 having solenoid coils 189, 190. A line 191 connects the solenoid coil 189 to a switch 192, and a line 193 connects the solenoid coil 190 to a switch 194. The switches 192, 194 have a common connection through the line 195 to the positive line 161. Operation of the switch 192 energizes the solenoid coil 189 for operation of the control valve 95 to move the upper mining head 22 upwardly, and operation of the switch 194 energizes the solenoid coil 190 for moving the upper mining head 22 downwardly. The switches 192, 194 constitute a manual means for operating the control valve 95 to move the upper mining head 22 upwardly and downwardly.

The electrical circuit for control of the mining machine 10 includes an automatic control system or circuit 200, which is connected to the sensing circuit 123, for automatically controlling the adjustment of the head support 18 in accordance with the operation of the sensing means of the lower cutting and breaking arm 36a. Upon closing of the contactor 166 a positive line 201 is connected to the positive line 160. A dual contact switch 202 has one side connected to the line 201 and a positive line 203 leads from the other side of the switch 202 to the automatic control circuit 200 for supplying current to the latter.

The automatic control circuit 200 is connected to one side of the sensing circuit 123 by lines 204, 205. The line 204 is connected to the line 133a in circuit with the lower-most light 134a. Upon operation of the sensing circuit 123 to illuminate the lower-most light 134a, current is simultaneously delivered through line 204 to initiating relay coil 206 to energize the latter. A rectifier 207 is connected across the coil 206 to prevent the production of an incendiary spark in the sensing circuit 123, as may occur upon deenergization of the relay coil 206 as a result of the reverse voltage which is induced therein. Energization of the initiating relay coil 206 closes a normally open relay contactor 206a, which energizes an operating relay coil 208. Energization of the relay coil 208 opens a normally closed relay contactor 208a and closes a normally open relay contactor 208b. Upon opening of the relay contactor 208a, the circuit through the line 209 is opened, which deenergizes the solenoid coil 182. The circuit through the line 210 remains open upon closing of the relay contactor 208b, and accordingly, the solenoid coil 181 remains deenergized. Thus, when the operating relay coil 208 is energized, the solenoid coils 181, 182 are maintained deenergized, and there is no adjustment of the head support 18, the latter being held in fixed position. The automatic control circuit 200 will operate in this manner when the sensing means of the lower cutting and breaking arms 36a only skims the different material of the mine face at the bottom thereof. That is to say, the sensing bit assembly 40 merely makes contact with the different material in the mine face, but does not cut into this material of the mine face to any significant depth. It will be understood that in this condition of operation the signal light 134a is illuminated.

When the cutting and breaking arm 36a is operated completely within the selected material of the mine face, and makes no contact with the different material of the mine face, the sensing means thereof is inoperative and the lower-most light 134a is not illuminated. In this condition of operation the initiating relay coil 206 is not energized, and the relay contactors 208a, 208b will remain closed and open, respectively. Also, in this condition of operation there is a circuit through the line 209 to the solenoid coil 182, energizing the latter and operating the control valve 94 to lower the head support 18. Such downward adjustment of the head support 18 will continue until the sensing means of the cutting and breaking arm 36a contacts the different material of the mine face at the bottom thereof to energize the initiating relay coil 206 for stopping the adjustment of the head support 18 to maintain the latter fixed in adjusted position, in which the operation of the sensing bit assembly 40 is to only skim the different material of the mine face at the bottom thereof.

When there is an overadjustment of the head support 18 downwardly, or if for other reasons the sensing bit assembly 40 works its way deeper in the different material of the mine face at the bottom thereof, such that the light 134b is illuminated, then current will be delivered to the automatic control circuit 200 from the sensing circuit 123 through the line 205. It will be understood that when the light 134b is illuminated, the lowermost light 134a will also be illuminated, thereby indicating the depth of operation of the sensing bit assembly 40 in the different material of the mine face. The line 205 is connected to an initiating relay coil 211, which is energized when the light 134b is illuminated. A rectifier 213 is connected across the initiating relay coil 211 to prevent the production of an incendiary spark in the sensing circuit 123, as may be produced by the reverse voltage induced in the relay coil 211 when the latter is deenergized. Energization of the initiating relay coil 211 closes a normally open initiating relay contactor 211a. Closing of the contactor 211a energizes the operating relay coil 212, which opens a normally closed relay contactor 212a and closes a normally open relay contactor 212b. Upon closing of the relay contactor 212b, the circuit through the line 210 is closed, thereby energizing solenoid coil 181 for raising the head support 18, whereby the sensing bit assembly 40 will be moved upwardly out of the different material at the bottom of the mine face. Such adjustment of the head support 18 will continue until the operation of the sensing bit assembly 40 is such that it only skims the different material of the mine face, at which time only the lower-most light 134a will be illuminated, and the adjusting operation of the head support 18 will cease, as above described, to maintain the operation of the cutting and breaking arm 36a and its sensing bit assembly 40 in the selected material of the mine face.

The automatic control system or circuit 200 is used alternatively with the manual switches 184, 186. The switch 202 is provided for connecting the automatic control circuit 200 into the operating circuit of the mining machine 10, when it is desired to make use of the automatic control circuit 200. When the automatic control circuit 200 is utilized, the manual switches 184, 186 remain inactive, and are not used for adjustment of the head support 18.

A second automatic control system or circuit 215 is provided for automatic adjustment of the upper mining head 22, by which the latter is raised and lowered with respect to the lower mining head 20, which is a separating or closing operation of the mining heads 20, 22. A line 216 leads from the switch 202 to the automatic control circuit 215 for operation of the latter. Upon closing of the switch 202 the automatic control circuit 215 is connected into the control circuit for the mining machine 10.

The automatic control circuit 215 is connected to one side of the sensing circuit 123 by lines 217, 218. The line 217 leads from the line 138a connecting to the uppermost light 139a, and when the latter is illuminated the initiating relay coil 219 is energized to close initiating relay contactor 219a. A rectifier 221 is connected across the initiating relay coil 219 to prevent the production of an incendiary spark in the sensing circuit 123, as may be produced upon deenergization of the relay coil 219 by the reverse voltage induced therein. The operating relay coil 220 is energized by closing of the relay contactor 219a and operates to open a normally closed relay contactor 220a and to close normally open relay contactor 220b. Upon opening of the normally closed contactor 220a, the circuit through line 222 is opened to deenergize the solenoid coil 189. The circuit to the solenoid coil 190 through line 223 remains open upon closing of the relay contactor 220b, and accordingly, the solenoid coil 190 will remain deenergized. Thus, in this condition of operation there will be no adjustment of the upper mining head 22, and the latter will remain fixed in adjusted position. The uppermost light 139a is illuminated when the sensing means of the upper cutting and breaking arm 38a is operated in such manner that the sensing bit assembly 47 only skims the different material of the mine face at the top thereof.

When the upper cutting and breaking arm 38a, including the sensing bit assembly 47, is worked deeper into the different material of the mine face, either by reason of overadjustment, or by reason of the deviating path of the selected material in the mine, the second light 139b will be illuminated by the sensing circuit 123, and current will be delivered to the automatic control circuit 215 through line 218. The line 218 is connected to the initiating relay coil 224, which is energized when the second light 139b is illuminated. A rectifier 225 is connected across the relay coil 224 to prevent the production of an incendiary spark in the sensing circuit 123 when the relay coil 224 is deenergized, as may be produced by the reverse induced voltage in the relay coil 224. Energization of the initiating relay coil 224 closes a normally open relay contactor 224a, which energizes operating relay coil 226. By energization of the relay coil 226, the normally closed relay contactor 226a is opened and the normally open relay contactor 226b is closed. The circuit through line 222 to the solenoid coil 189 will remain open, and the circuit through line 223 to the solenoid coil 190 will be closed, thereby energizing the solenoid coil 190 for operation of the control valve 95 to lower the upper mining head 22 to bring the operation of the cutting and breaking arm 38a and its sensing bit assembly 47 downwardly out of the different material of the mine face at the top of the latter. Such adjustment of the upper mining head 22 will continue until the operation of the upper cutting and breaking arm 38a and its sensing bit assembly 47 is such that the latter only skims the different material of the mine face at the top thereof.

The automatic control circuit 215 for adjustment of the upper mining head 22 is used alternatively with the manual switches 192, 194. When the automatic control circuit 215 is connected into the electrical circuit of the mining machine 10 by closing of the switch 202, the manual switches 192, 194 are maintained inactive.

The cutting and breaking arms 36, 38 of the mining machine 10 are rotated at a regular rate of speed, which may be sixty rotations per minute. Considering the cutting and breaking arm 36a as exemplary, the cutting and breaking arm 36a will thus make one rotation each second. Accordingly, the brush 128 will revolve around the commutator 124 once each second, corresponding to the rotation of the cutting and breaking arm 36a. Assuming that the condition of operation of the cutting and breaking arm 36a is such that the sensing bit assembly 40 thereof is only skimming the different material of the mining face, the brush 128 will contact the commutator segment 132a once every second, and the interval of contact will be only for a fraction of a second. The signal light 134a will thus be illuminated for a fraction of a second once every second.

Considering the intermittent contact of the brush 128 with the commutator segment 132a, it will be apparent that the circuit through line 204 to the control system or circuit 200 will be energized intermittently at timed intervals corresponding to the speed of rotation of the cutting and breaking arm 36a. In order to avoid a hunting operation in adjustment of the head support 18 by the control circuit 200, the operating relay coil 208 includes a time delay which, in the presently described system, may be a time delay of one and a half seconds. Thus, during the time delay operation of the operating relay coil 208, the brush 128 will contact the commutator segment 132a at least twice. Stated another way, upon energization of the operating relay coil 208 the latter will remain operative for at least one and a half seconds. If the circuit through the line 204 is energized only once the operating relay coil 208 will be operative for a period of one and a half seconds, and then will be rendered inoperative. Thus, should there be successive energizations of the circuit through line 204, the operating relay coil 208 will remain constantly operative to continuously maintain the adjustment of the head support 18.

In the control circuit 200 the operating relay coil 212 and in the control circuit 215 the operating relay coils 220, 226 each includes a time delay as described in connection with the operating relay coil 208, for the same purpose of avoiding a hunting operation in adjustment of the mining heads 20, 22. The hydraulic operating system by which the adjustment of the head support 18 and the mining heads 20, 22 is accomplished is sufficiently slow operating that there is no overadjustment as a result of the time delay embodied in the operating relay coils 208, 212, 220, 226.

Figure 8:
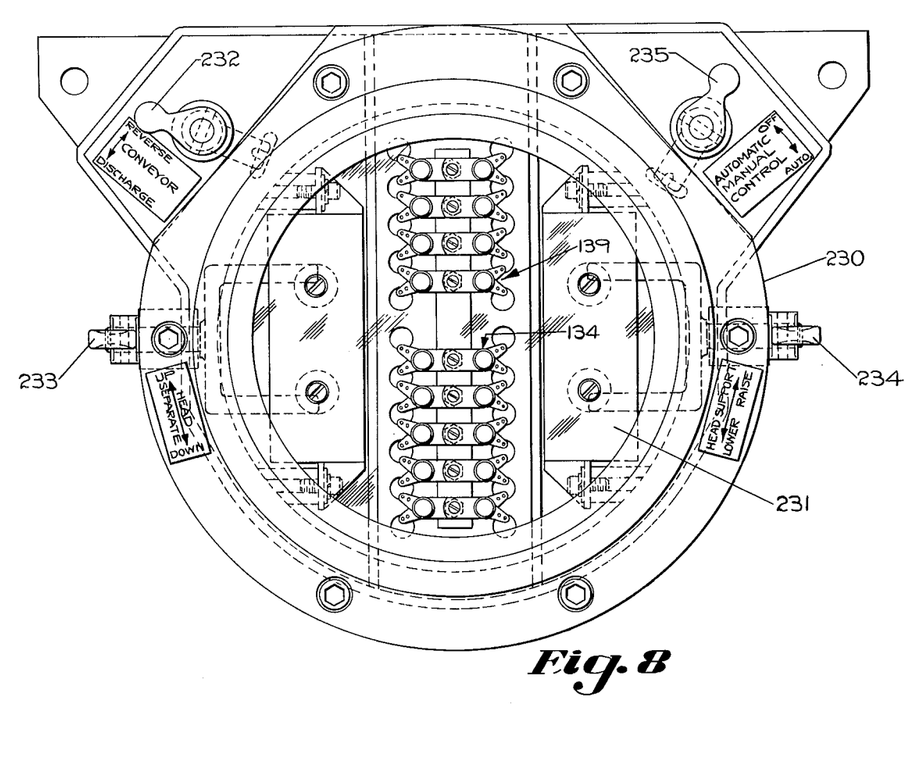
FIG. 8 is an elevational view of the control box for the mining machine.

The mining machine 10 is provided with a control box 230 which is mounted at the right side of the mining machine 10 near the rear end thereof. In the center of the control box 230 there are mounted the several signal lights 134, 139 arranged in two vertical rows side by side. The face of the control box 230 has a glass panel 231, which seals the front of the control box 230 and permits observation of the signal lights 134, 139. At the upper left of the control box 230 there is provided a switch actuator 232 for operating the switch 171 by which the direction of operation of the conveyor 61 is controlled. At the left side of the control box 230 there is provided a switch actuator 233 for operating the switches 192, 194 by which the upper mining head 22 is raised or lowered with respect to the lower mining head 20. At the right side of the control box 230 there is provided a switch actuator 234 for operation of the switches 184, 186 by which the head support 18 is raised or lowered. At the upper right side of the control box 230 there is provided a switch actuator 235 for operation of the switch 202 by which the automatic control circuits 200, 215 are connected into the circuit for operation of the mining machine 10. It will be understood that each of the switch actuators 232, 233, 234, 235 is provided with a suitable mechanical connection to the respective electrical switches, which are mounted within the control box 230, for operation thereof.

In the illustrated embodiment of the invention the control box 230 is mounted on the mining machine 10. However, it will be understood that the control box 230 may be mounted separately from the mining machine 10 as will be the case where it is incorporated in a remote control mining machine system in which the operator is located at a position spaced some distance from the mining machine 10.

Obviously those skilled in the art may make various changes in the details and arrangement of parts without departing from the spirit and scope of the invention as defined by the claims hereto appended, and applicant therefore wishes not to be restricted to the precise construction herein disclosed.

Having thus described and shown an embodiment of the invention, what it is desired to secure by Letters Patent of the United States is:

1. In a mining machine for removing selected material from a mine face, an adjustable mining head including a cutting and breaking element adapted to be advanced into the mine face for removing the selected material therefrom by a cutting and breaking action, means for adjusting said mining head, solenoid means for controlling operation of said adjusting means, said cutting and breaking element including sensing means for sensing material of the mine face which is different from the selected material of the mine face, a control system including a relay having a coil and a normally closed contactor energizing said solenoid means for adjustment of the mining head, said sensing means including circuit means responsive to the depth of penetration of the sensing means into said different material of the mine face for energizing the coil to open the contactor and deenergize the solenoid means when the mining head is adjusted such that the cutting and breaking element is operated in said selected material and only skims said different material to maintain the mining head fixed in adjusted position.

2. In a mining machine for removing selected material from a mine face, an adjustable mining head including a cutting and breaking element adapted to be advanced into the mine face for removing the selected material therefrom by a cutting and breaking action, means for adjusting said mining head, solenoid means for controlling operation of said adjusting means, said cutting and breaking element including sensing means for sensing material of the mine face which is different from the selected material of the mine face, a control system including an operating relay and an initiating relay, said operating relay having a coil and a normally closed contactor energizing said solenoid means for adjustment of the mining head, said initiating relay having a coil and a normally open contactor connected to the operating relay coil and adapted to be closed by energization of the initiating relay coil to energize the operating relay coil to open the operating relay contactor, said sensing means including circuit means responsive to the depth of penetration of the sensing means into said different material of the mine face for energization of the initiating relay coil when the cutting and breaking element is operated in said selected material and only skims said different material to maintain the mining head fixed in adjusted position.

3. In a mining machine for removing selected material from a mine face, an adjustable mining head including a cutting and breaking element adapted to be advanced into the mine face for removing the selected material therefrom by a cutting and breaking action, means for adjusting said mining head, said cutting and breaking element including sensing means for sensing material of the mine face which is different from the selected material of the mine face, a control system operating said adjusting means for adjustment of said mining head, said sensing means including means responsive to the depth of penetration of the sensing means into said different material of the mine face, and said responsive means being connected to the control system to transmit a signal from the sensing means to the control system to stop operation thereof when the mining head is adjusted such that the cutting and breaking element is operated in said selected material and only skims said different material to maintain the mining head fixed in adjusted position.

4. In a mining machine for removing selected material from a mine face, an adjustable mining head including a cutting and breaking element adapted to be advanced into the mine face for removing the selected material therefrom by a cutting and breaking action, means for adjusting said mining head, solenoid means for controlling operation of said adjusting means, said cutting and breaking element including sensing means for sensing material of the mine face which is different from the selected material of the mine face, a control system including a first relay and a second relay, said first relay having a coil and a normally closed contactor energizing said solenoid means for adjustment of the mining head when said cutting and breaking element is operated only in said selected material to advance the cutting and breaking element toward said different material, said second relay having a coil and a normally open contactor adapted to be closed upon energization of the coil for energizing said solenoid means for adjustment of the mining head, said sensing means including circuit means responsive to the depth of penetration of the sensing means into said different material of the mine face for energizing the coil of the first relay to open its contactor when the cutting and breaking element is operated in said selected material and only skims said different material to maintain the mining head fixed in adjusted position and said responsive circuit means energizing the coil of the second relay to close its contactor when the cutting and breaking element is operated in material different from the selected material to a greater depth than said skimming condition to adjust the mining head to withdraw the cutting and breaking element from said different material and to thereby maintain the operation of the cutting and breaking element in the selected material of the mine face with the cutting and breaking element only skimming said different material of the mine face.

5. In a mining machine for removing selected material from a mine face, an adjustable mining head including a cutting and breaking element adapted to be advanced into the mine face for removing the selected material therefrom by a cutting and breaking action, means for adjusting said mining head, solenoid means for controlling operation of said adjusting means, said cutting and breaking element including sensing means for sensing material of the mine face which is different from the selected material of the mine face, a control system including a first operating relay and a first initiating relay therefor and a second operating relay and a second initiating relay therefor, said first operating relay having a coil and a normally closed contactor energizing said solenoid means for adjustment of the mining head when said cutting and breaking element is operated only in said selected material to advance the cutting and breaking element toward said different material, said first initiating relay having a coil and a normally open contactor connected to the first operating relay coil and adapted to be closed by energization of the initiating relay coil to energize the first operating relay coil, said second operating relay having a coil and a normally open contactor adapted to be closed upon energization of the coil for energizing said solenoid means for adjustment of the mining head, said second initiating relay having a coil and a normally open contactor connected to the second operating relay coil and adapted to be closed by energization of the initiating relay coil to energize the second operating relay coil, said sensing means including circuit means responsive to the depth of penetration of the sensing means into said different material of the mine face for energizing the first initiating relay coil to close its contactor when the cutting and breaking element is operated in said selected material and only skims said different material to maintain the mining head fixed in adjusted position and said responsive circuit means energizing the second initiating relay coil to close its contactor when the cutting and breaking element is operated in material different from the selected material to a greater depth than said skimming condition to adjust the mining head to withdraw the cutting and breaking element from said different material and to thereby maintain the operation of the cutting and breaking element in the selected material of the mine face with the cutting and breaking element only skimming said different material of the mine face.

References Cited by the Examiner

UNITED STATES PATENTS

| 2,320,196 | 5/43 | Roe. |
| 2,741,468 | 4/56 | Alspaugh. |
| 2,761,666 | 9/56 | Heimaster et al. |
| 3,019,338 | 1/62 | Monaghan et al. |
| 3,108,789 | 10/63 | Heimaster et al. |

BENJAMIN HERSH, *Primary Examiner.*

PHILLIP ARNOLD, *Examiner.*